(12) United States Patent
Burns

(10) Patent No.: US 7,628,343 B2
(45) Date of Patent: Dec. 8, 2009

(54) TRIGGERS FOR FLUID APPLICATORS

(75) Inventor: Marvin D. Burns, Millbury, OH (US)

(73) Assignee: Illinois Tool Works Inc., Glenview, IL (US)

( * ) Notice: Subject to any disclaimer, the term of this patent is extended or adjusted under 35 U.S.C. 154(b) by 74 days.

(21) Appl. No.: 11/781,437

(22) Filed: Jul. 23, 2007

(65) Prior Publication Data

US 2008/0035759 A1 Feb. 14, 2008

Related U.S. Application Data

(60) Provisional application No. 60/836,338, filed on Aug. 8, 2006.

(51) Int. Cl.
*B05B 9/01* (2006.01)
(52) U.S. Cl. .................... 239/526; 239/525
(58) Field of Classification Search ............... 239/525, 239/526
See application file for complete search history.

(56) References Cited

U.S. PATENT DOCUMENTS

| 1,460,441 | A | * | 7/1923 | Popper | 42/57 |
| 1,982,056 | A | * | 11/1934 | Jenkins | 239/301 |
| 3,001,031 | A | | 9/1961 | Jacque | |
| 3,408,887 | A | * | 11/1968 | Villo | 83/140 |
| 3,408,985 | A | | 11/1968 | Sedlacsik, Jr. | |
| 7,195,181 | B2 | * | 3/2007 | Steingass et al. | 239/581.1 |
| 7,434,751 | B1 | * | 10/2008 | Chen | 239/526 |
| 2004/0057810 | A1 | | 3/2004 | Breslin | |
| 2005/0191152 | A1 | * | 9/2005 | Iwata | 411/386 |
| 2007/0003365 | A1 | * | 1/2007 | Walt et al. | 403/362 |
| 2007/0034716 | A1 | * | 2/2007 | Zittel et al. | 239/296 |
| 2008/0296410 | A1 | * | 12/2008 | Carey et al. | 239/526 |

FOREIGN PATENT DOCUMENTS

| DE | 10129667 A1 | 1/2003 |
| EP | 0333040 A2 | 3/1989 |
| EP | 1566222 A1 | 10/2003 |
| EP | 1634651 A1 | 1/2005 |
| EP | 1662154 A1 | 5/2006 |
| WO | 2008020953 A2 | 2/2008 |

OTHER PUBLICATIONS

PCT International Search Report, PCT/US2007/016416, Mar. 11, 2008, 15 pages.

* cited by examiner

*Primary Examiner*—Len Tran
*Assistant Examiner*—Justin Jonaitis
(74) *Attorney, Agent, or Firm*—Dinsmore & Shohl, LLP

(57) ABSTRACT

Trigger assemblies and trigger studs for gun bodies.

19 Claims, 3 Drawing Sheets

TRIGGERS FOR FLUID APPLICATORS

CROSS REFERENCE TO RELATED APPLICATION

This application claims the benefit of the following U.S. Provisional Application: Ser. No. 60/836,338 for TRIGGERS FOR FLUID APPLICATORS, filed Aug. 8, 2006.

BACKGROUND OF THE INVENTION

The present invention is directed generally to a trigger for a fluid applicator, and more particularly to triggers and trigger studs to attach the trigger to the fluid applicator.

Fluid applicators, such as gravity feed paint spray guns, suction feed paint spray guns, or pressure feed spray guns, have a trigger which is used to control the dispensing of the fluid. Typically, the trigger is attached to the gun body using a trigger stud. The trigger has a pair of legs which extend upward from the trigger. The gun body is positioned between the trigger legs. The trigger stud extends through an opening in the gun body, and the ends of the stud extend beyond legs to secure the legs to the gun body.

Traditionally, the triggers on spray guns are loose fitting on the guns bodies and the trigger studs. This allows the trigger to rattle when the gun is shaken. To eliminate this problem, some vendors have added small wave disk springs between the gun body and the trigger. This adds additional components to the system. The parts are small and easily lost when the gun is disassembled. In addition, the small parts make the system difficult to assemble.

There are generally three types of trigger studs. One type includes a trigger stud and screw. The trigger stud and screw both have a screw driver slot or hex head. This type requires the use of two tools to remove the trigger stud and screw. For example, one screwdriver can be used to prevent the trigger stud from rotating, while another is used to remove the screw. Removing this type of trigger stud is generally awkward because it requires holding the gun as well as holding one tool on the trigger stud and manipulating the second tool for the screw.

A second type includes a trigger stud with two retaining clips, one on each end of the trigger stud. One of the retaining clips is removed to remove this trigger stud. However, the retaining clip is difficult to remove and is easily lost when removed.

The third type includes a trigger stud with a head on one side and a retaining clip on the other. The retaining clip is removed to remove the trigger stud. As discussed, the retaining clip is difficult to remove and easily lost.

All three styles include multiple parts and are loose fitting in the gun body. The presence of multiple parts makes the trigger stud difficult to remove and replace. In addition, the trigger stud rattles because it is loose in the gun body.

Therefore, there is a need for an improved triggers and trigger studs.

SUMMARY OF THE INVENTION

The present invention meets this need by providing an improved trigger and improved trigger studs.

One aspect of the invention is a one piece trigger stud. The one piece trigger stud comprises a first portion and a second portion, the first portion having a head on one end, and the second portion having a threaded section on an outside surface, the threaded section adapted to mate with threads on an inside surface of the hole in the gun body, the trigger stud extending through the openings in the legs, the head securing the legs to the trigger stud.

Another aspect of the invention is a trigger stud. One end of the trigger stud has a non-cylindrical shape, and one end of the trigger stud has a threaded bore for receiving a screw, the ends of the trigger stud extending through the openings in the legs; and a screw adapted to be placed in the threaded bore, the screw securing the leg to the trigger stud.

Another aspect of the invention is a trigger assembly for a gun body. The trigger assembly comprises a trigger having a pair of upwardly extending legs, each leg having an opening therein, the legs being adapted to be positioned around a hole through the gun body, the legs being biased toward the gun body; and a trigger stud adapted to be positioned in the hole in the gun body and extending through the openings in the legs.

Another aspect of the invention is a trigger assembly for a gun body. The trigger assembly comprises a trigger having a pair of upwardly extending legs, each leg having an opening therein, the legs being adapted to be positioned around a hole through the gun body, the legs being separated by a distance, the distance being less than a width of the gun body; and a trigger stud adapted to be positioned in the hole in the gun body and extending through the openings in the legs.

DETAILED DESCRIPTION OF THE INVENTION

Figure 1:
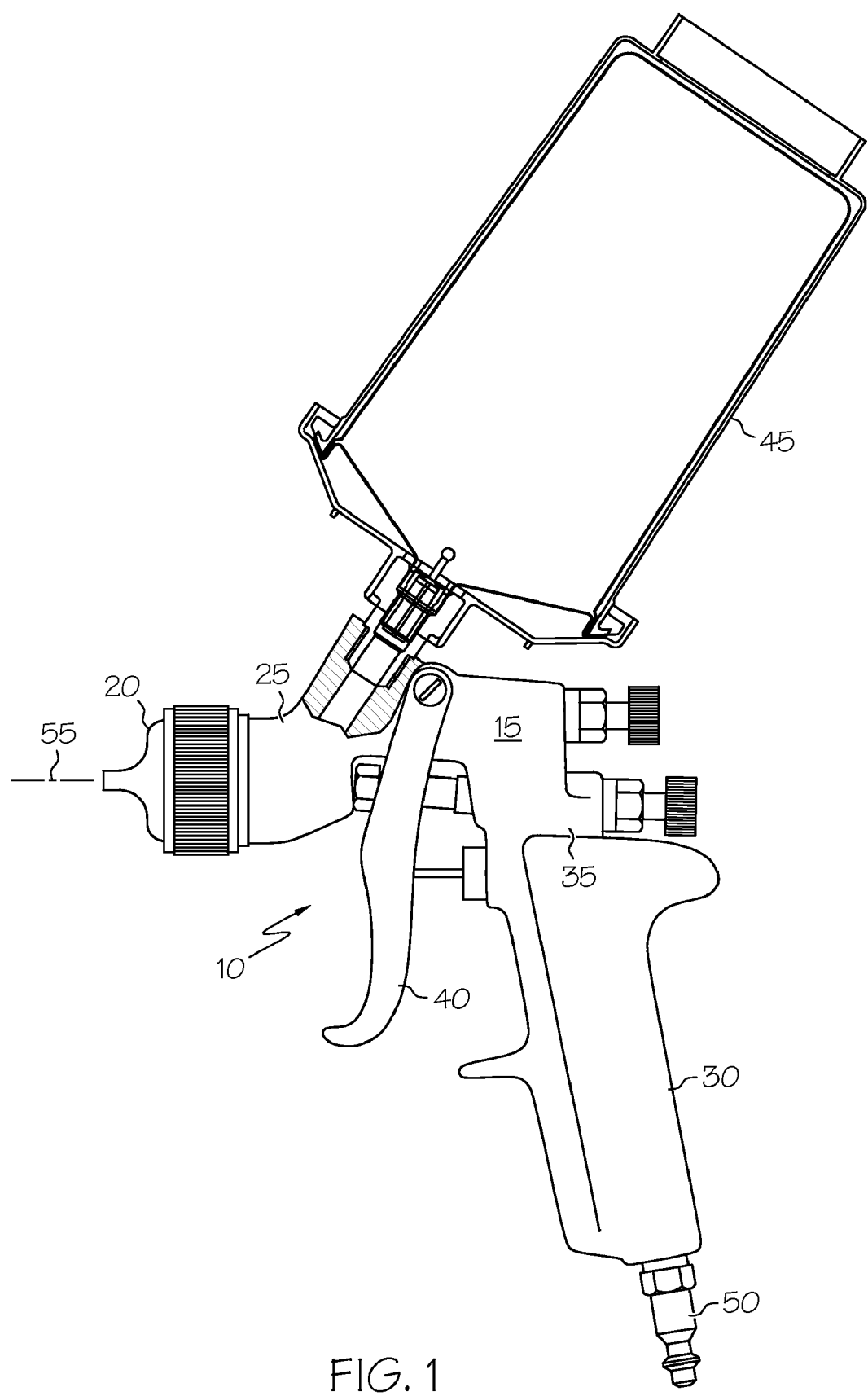
FIG. 1 is side elevation view of a gravity-feed paint sprayer with a fluid supply assembly according to the present invention.

A fluid applicator is shown in FIG. 1. The fluid applicator is used to apply fluid to a surface, for example, a paint sprayer to apply paint to a surface. The present invention will be described for a paint sprayer, such as a gravity feed paint sprayer for use in applying paint to coat substrate surfaces. The paint sprayer can be used in the automotive refinishing market, such as automobile body shops, for repainting automobiles. Although the fluid supply assembly is described for a paint sprayer, it is not limited to such use. It can be used for supplying other flowable liquids, including, but not limited to, beverages, foods, condiments (such as ketchup), gasoline, petrochemicals and hydrocarbons, water, water-based solutions, solvent-based solutions, emulsions, adhesives, and the like.

Referring to FIG. 1, a paint sprayer 10 is shown. It includes a body 15, a nozzle assembly 20 secured to a front end 25 of body 15, and a handle 30 depending from a rear end 35 of body 15. A trigger 40 is pivotally secured to body 15 for the manual actuation of sprayer 10. A top-mounted paint supply assembly 45 is mounted to body 15 near front end 25 for feeding paint to nozzle assembly 20. An air connector 50 is connected to an air hose (not shown) for the delivery of pressurized air to nozzle assembly 20, wherein the delivery of pressurized air is controlled by trigger 40.

Compressed air from air connector 50 is delivered through an internal passage (not shown) to nozzle assembly 20 and the compressed air acts to atomize paint and deliver it through nozzle assembly 20 to spray paint about paint axis 55. Paint is delivered to nozzle assembly 20 from paint supply assembly 45.

Figure 2:
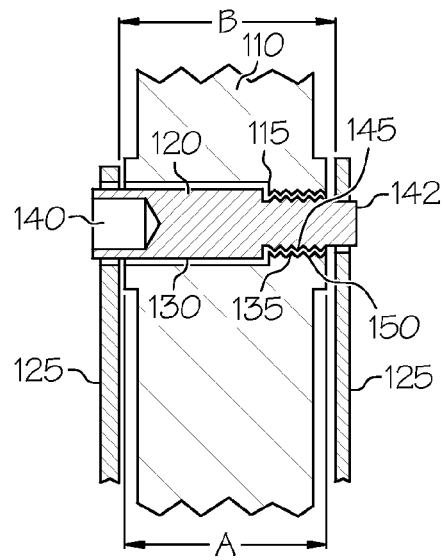
FIG. 2 shows a cross-section view of one embodiment of a trigger stud of the present invention on a gun.
Figure 6A:
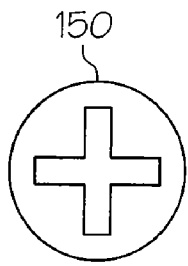
FIGS. 6A-C show various embodiments of the end of the trigger stud.
Figure 6B:
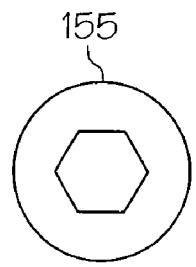
Figure 6C:
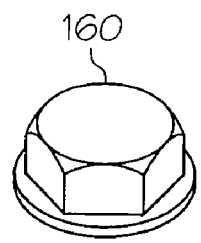

One embodiment of the trigger stud is shown in more detail in FIG. 2. In this embodiment, there is a gun body 110 with a hole 115 through it. There is a one piece trigger stud 120 positioned in the hole 115. The ends of the trigger stud 120 extend through openings in the upwardly extending legs 125 of the trigger (not shown). Typically, the first portion 130 of the trigger stud 120 has a greater diameter than the second portion 135. The first portion 130 has an end 140. The end 140 can have a slot 150 (FIG. 6A) for a screwdriver (straight or Philips) with or without a head, a hexagonal opening 155 (FIG. 6B) for an Allen wrench with or without a head, a hexagonal head 160 (FIG. 6C) or a head with another shape for a wrench, or any shape which can accommodate a tool. Alternatively, the second portion 135 can have an end 142 with the same options (FIGS. 6A-C).

There is a threaded section 145 on the second portion 135. The threaded section mates with threads 150 on the inside of the hole 115.

The legs 125 of the trigger are positioned around the hole 115 in the gun body 110, and the trigger stud 120 is inserted into the hole 115. When the second portion 135 of the trigger stud 120 reaches the threads 150 in the hole, the trigger stud 120 is screwed into the gun body 110 using a screwdriver or other tool. The trigger stud 120 can be tightened against the shoulder in the gun body 110.

This trigger stud has several advantages. First, it is a one piece design, with no small parts to handle or lose. In addition, it is easy to remove, and removal requires only a single tool. Finally, it can be secured tightly to the gun body, eliminating rattle in the trigger stud.

Figure 3:
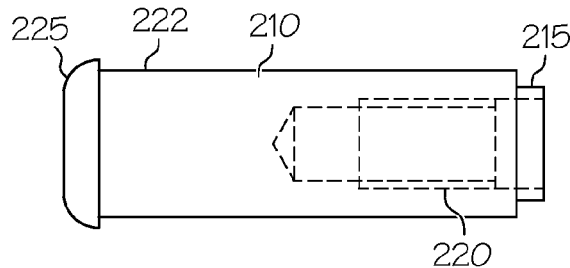
FIG. 3 shows a cross-section of another embodiment of the trigger stud of the present invention.
Figure 4:
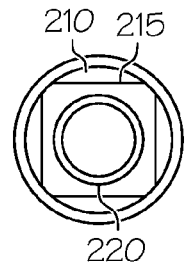
FIG. 4 shows an end view of the trigger stud of FIG. 3.
Figure 7:
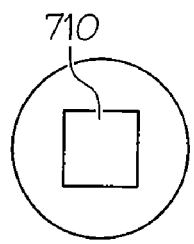
FIG. 7 shows one embodiment of a hole in the gun body with a non-cylindrical portion.

Another embodiment of the trigger stud is shown in FIGS. 3 and 4. The trigger stud 210 has a non-cylindrical portion 215. The non-cylindrical portion 215 can be any non-cylindrical shape which prevents the trigger stud from rotating, including, but not limited to, a square, rectangle, hexagon, triangle, oval, round with one or more flat sections, star-shaped. The trigger stud has a threaded bore 220 for receiving a screw. The non-cylindrical portion 210 can be on the end with the threaded bore as shown in FIG. 3, or on the opposite end 222. In either case, there could be a head 225 on the opposite end 222. A portion of the hole in the gun body can have a non-cylindrical portion 710 (FIG. 7) as well, if desired.

Figure 8:
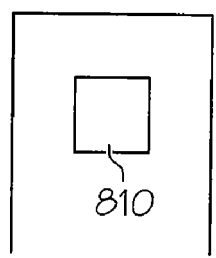
FIG. 8 shows one embodiment of a non-cylindrical opening in the leg of the trigger.

The trigger stud 210 is inserted into the hole in the gun body. The non-cylindrical portion 215 fits into a non-cylindrical shaped opening 810 (FIG. 8) in one of the legs of the trigger. This design requires only one tool to remove the trigger stud because the non-cylindrical portion prevents rotation of the trigger stud when the screw is inserted or removed.

Figure 9:
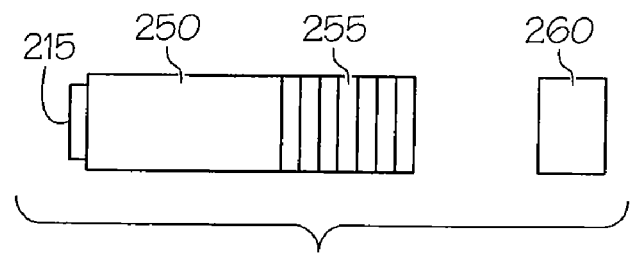
FIG. 9 shows one embodiment of a trigger stud with external threads and nut.

Alternatively, instead of a threaded bore and screw, the trigger stud 250 could have an external threaded section 255 which would be secured using a nut 260 (FIG. 9).

Figure 5:
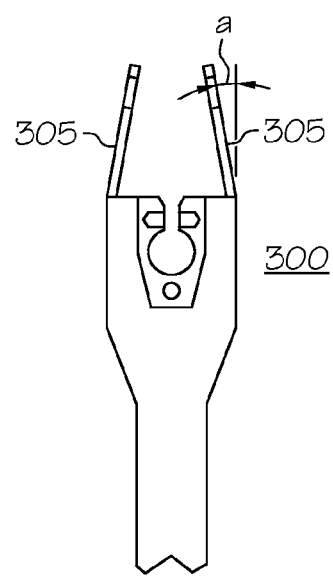
FIG. 5 shows a cross-section view of an improved trigger of the present invention.

FIG. 5 shows an improved trigger 300 which can be used with the trigger studs of the present invention. The trigger has a pair of legs 305 which are biased toward each other. The bias provides enough interference between the trigger and the gun body to eliminate the rattle that is typical on spray guns. In general, the angle a inward on each leg is less than about 20°, or less than about 15°, or less than about 10°, or less than about 5°, or in the range of about 1 to about 5°. For trigger legs of about 1⅛ in long, the angle is typically about 2 to about 4°. The shorter the trigger legs are, the larger the angle should be to provide an suitable amount of interference. No additional components are added, and the trigger is easy to assemble.

Alternatively, a suitable amount of interference could be provided by making the distance between the trigger legs B less than the width of the gun body A at the place where the trigger is attached (FIG. 2).

While certain representative embodiments and details have been shown for purposes of illustrating the invention, it will be apparent to those skilled in the art that various changes in the compositions and methods disclosed herein may be made without departing from the scope of the invention, which is defined in the appended claims.

What is claimed is:

1. A trigger stud for attaching a trigger to a gun body, the gun body having a hole therethrough, the hole have a first cylindrical portion and a second cylindrical portion, the first portion having a diameter greater than the second portion, the trigger having a trigger portion and a pair of legs extending upward from the trigger portion, each leg having an opening therein, the legs being positioned on opposite sides of the hole through the gun body, the trigger stud comprising:

a one piece trigger stud adapted to be positioned in the hole in the gun body, the trigger stud comprising a first cylindrical portion and a second cylindrical portion, the first portion having a diameter greater than the second portion, the first and second portions having opposite ends, and the second portion having a threaded section on an outside surface, the threaded section adapted to mate with threads on an inside surface of the hole in the gun body, the first portion having an optional head on the end opposite the second portion, the optional head on the first portion having a diameter greater the diameter of the first portion, the trigger stud extending through the hole in the gun body and through the openings in the legs positioned on opposite sides of the hole in the gun body and securing the legs to the gun body.

2. The trigger stud of claim 1 wherein the end of the first portion includes a slot, a hexagonal opening, or the optional head with a hexagonal shape.

3. The trigger stud of claim 1 wherein the end of the second portion includes a slot, a hexagonal opening, or the optional head with a hexagonal shape.

4. A trigger stud for a trigger for a gun body, the gun body having a hole therethrough, the trigger having a trigger portion and a pair of legs extending upward from the trigger portion, each leg having an opening therein, the legs being positioned on opposite sides of the hole through the gun body, the opening in one of the legs having a non-cylindrical shape, the trigger stud comprising:

a trigger stud adapted to be positioned in the hole in the gun body, one end of the trigger stud having a non-cylindrical shape, and one end of the trigger stud having a threaded section, the threaded section selected from internal threads in a bore in the trigger stud and external threads on the trigger stud, the trigger stud extending through the hole in the gun body and through the openings in the legs, the end of the trigger stud having the non-cylindrical shape fitting into the opening in one of the legs having the non-cylindrical shape; and a complementary threaded piece, the complementary threaded piece selected from a screw adapted to be placed in the threaded bore or a nut adapted to be placed on the external threads, the complementary threaded piece securing the leg to the gun body, wherein when the end of the trigger stud having the non-cylindrical shape is the end with the threaded section, the threaded section is the internal threads in the bore in the trigger stud and the complementary threaded piece is the screw, and when the end of the trigger stud having the non-cylindrical shape is the end opposite the threaded section, the threaded section is the external threads on the trigger stud and the complementary threaded piece is the nut, and wherein when the end of the trigger stud having the non-cylindrical shape is fitted into the opening in one of the legs having the non-cylindrical shape, rotation of the trigger stud is prevented when the complementary piece is attached or removed.

5. The trigger stud of claim 4 wherein the end of the trigger stud having the non-cylindrical shape is the end with the threaded section.

6. The trigger stud of claim 4 wherein the end of the trigger stud having the non-cylindrical shape is the end opposite the threaded section.

7. The trigger stud of claim 4 wherein the non-cylindrical shape is selected from square, rectangular, hexagonal, triangular, oval, round with at least one flat section, or star-shaped.

8. A trigger assembly for a gun body, the gun body having a hole therethrough, comprising:
   a trigger having a trigger portion and a pair of legs extending upward from the trigger portion, each leg having an opening therein, the legs being positioned on opposite sides of the hole through the gun body, the legs being biased toward each other, each leg forming an angle inward from vertical; and
   a trigger stud adapted to be positioned in the hole in the gun body and extending through the hole in the gun body and through the openings in the legs positioned on opposite sides of the hole through the gun body;
   wherein the opening in one of the legs or a portion of the hole in the gun body has a non-cylindrical shape, and wherein one end of the trigger stud has a non-cylindrical shape, one end of the trigger stud has a threaded section, the threaded section selected from internal threads in a bore in the trigger stud and external threads on the trigger stud, the ends of the trigger stud extending through the openings in the legs, the end of the trigger stud having the non-cylindrical shape fitting into the opening in one of the legs having the non-cylindrical shape; and
   a complementary threaded section, the complementary threaded section selected from a screw adapted to be placed in the threaded bore or a nut adapted to be placed on the external threads, the complementary threaded section securing the leg to the gun body, wherein when the end of the trigger stud having the non-cylindrical shape is the end with the threaded section, the threaded section is the internal threads in the bore in the trigger stud and the complementary threaded piece is the screw, and when the end of the trigger stud having the non-cylindrical shape is the end opposite the threaded section, the threaded section is the external threads on the trigger stud and the complementary threaded piece is the nut, and wherein when the end of the trigger stud having the non-cylindrical shape is fitted into the opening in one of the legs having the non-cylindrical shape, rotation of the trigger stud is prevented when the complementary piece is attached or removed.

9. A trigger assembly for a gun body, the gun body having a hole therethrough, the hole have a first cylindrical portion and a second cylindrical portion, the first portion having a diameter greater than the second portion, the trigger assembly comprising:
   a trigger having a trigger portion and a pair of legs extending upward from the trigger portion, each leg having an opening therein, the legs being positioned on opposite sides of the hole through the gun body, the legs being biased toward each other, each leg forming an angle inward from vertical; and
   a one piece trigger stud adapted to be positioned in the hole in the gun body, the trigger stud comprising a first cylindrical portion and a second cylindrical portion, the first portion having a diameter greater than the second portion, the first and second portions having opposite ends, and the second portion having a threaded section on an outside surface, the threaded section adapted to mate with threads on an inside surface of the hole in the gun body, the first portion having an optional head on the end opposite the second portion, the optional head on the first portion having a diameter greater the diameter of the first portion, the trigger stud extending through the hole in the gun body and through the openings in the legs positioned on opposite sides of the hole in the gun body and securing the legs to the gun body.

10. The trigger assembly of claim 9 wherein the end of the first or second portion includes a slot, a hexagonal opening, or the optional head with a hexagonal shape.

11. The trigger assembly of claim 8 wherein the end of the trigger stud having the non-cylindrical shape is the end with the threaded section.

12. The trigger assembly of claim 8 wherein the end of the trigger stud having the non-cylindrical shape is the end opposite the threaded section.

13. A trigger assembly for a gun body, the gun body having a hole therethrough, comprising:
   a trigger having a trigger portion and a pair of legs extending upward from the trigger portion, each leg having an opening therein, the legs being positioned on opposite sides of the hole through the gun body, the legs being separated by a distance, the distance being less than a width of the gun body at the hole; and
   a trigger stud adapted to be positioned in the hole in the gun body and extending through the hole in the gun body and through the openings in the legs positioned on opposite sides of the hole through the gun body;
   wherein the opening in one of the legs or a portion of the hole in the gun body has a non-cylindrical shape, and wherein one end of the trigger stud has a non-cylindrical shape, one end of the trigger stud has a threaded section, the threaded section selected from internal threads in a bore in the trigger stud and external threads on the trigger stud, the ends of the trigger stud extending through the openings in the legs, the end of the trigger stud having the non-cylindrical shape fitting into the opening in one of the legs having the non-cylindrical shape; and
   a complementary threaded section, the complementary threaded section selected from a screw adapted to be placed in the threaded bore or a nut adapted to be placed on the external threads, the complementary threaded section securing the leg to the gun body, wherein when the end of the trigger stud having the non-cylindrical shape is the end with the threaded section, the threaded section is the internal threads in the bore in the trigger stud and the complementary threaded piece is the screw, and when the end of the trigger stud having the non-cylindrical shape is the end opposite the threaded section, the threaded section is the external threads on the trigger stud and the complementary threaded piece is the nut, and wherein when the end of the trigger stud having the non-cylindrical shape is fitted into the opening in one of the legs having the non-cylindrical shape, rotation of the trigger stud is prevented when the complementary piece is attached or removed.

14. A trigger assembly for a gun body, the gun body having a hole therethrough, the hole have a first cylindrical portion and a second cylindrical portion, the first portion having a diameter greater than the second portion, the trigger assembly comprising:

a trigger having a trigger portion and a pair of legs extending upward from the trigger portion, each leg having an opening therein, the legs being positioned on opposite sides of the hole through the gun body, the legs being separated by a distance, the distance being less than a width of the gun body at the hole; and a one piece trigger stud adapted to be positioned in the hole in the gun body, the trigger stud comprising a first cylindrical portion and a second cylindrical portion, the first portion having a diameter greater than the second portion, the first and second portions having opposite ends, and the second portion having a threaded section on an outside surface, the threaded section adapted to mate with threads on an inside surface of the hole in the gun body, the first portion having an optional head on the end opposite the second portion, the optional head on the first portion having a diameter greater the diameter of the first portion, the trigger stud extending through the hole in the gun body and through the openings in the legs positioned on opposite side of the hole in the gun body and securing the legs to the gun body.

15. The trigger assembly of claim 14 wherein the end of the first or second portion includes a slot, a hexagonal opening, or the optional head with a hexagonal shape.

16. The trigger assembly of claim 13 wherein the end of the trigger stud having the non-cylindrical shape is the end with the threaded section.

17. The trigger assembly of claim 13 wherein the end of the trigger stud having the non-cylindrical shape is the end opposite the threaded section.

18. The trigger stud of claim 1 wherein the first portion includes the head.

19. The trigger stud of claim 18 wherein the head includes a slot, or a hexagonal opening.

\* \* \* \* \*